United States Patent [19]
Miller et al.

[11] 3,926,298
[45] Dec. 16, 1975

[54] SHEET ARTICLE TRANSFER APPARATUS

[75] Inventors: Alfred H. Miller; Lawrence C. Wheat, both of Toledo, Ohio

[73] Assignee: Libbey-Owens-Ford Company, Toledo, Ohio

[22] Filed: May 31, 1974

[21] Appl. No.: 475,135

[52] U.S. Cl. .............. 198/20 R; 193/35 SS; 193/36; 198/31 R; 198/127 R
[51] Int. Cl.² ......................................... B65G 47/64
[58] Field of Search ......... 198/127 R, 31 R, 31 AA, 198/31 AB, 78, 81, 20 R; 193/36, 35 SS

[56] References Cited
UNITED STATES PATENTS

| | | | |
|---|---|---|---|
| 1,761,199 | 6/1930 | Drake | 198/127 R |
| 3,269,519 | 8/1966 | De Good et al. | 198/127 R |
| 3,279,583 | 10/1966 | Abegglen | 198/78 |
| 3,303,923 | 2/1967 | Davis | 198/81 |
| 3,334,723 | 8/1967 | Reed et al. | 198/31 AB |
| 3,680,677 | 8/1972 | Branch et al. | 198/31 R |

*Primary Examiner*—Richard A. Schacher
*Assistant Examiner*—Jeffrey V. Nase
*Attorney, Agent, or Firm*—Collins, Oberlin & Darr

[57] ABSTRACT

An apparatus for transferring sheet articles conveyed along a primary path to a lower elevation secondary path extending angularly therefrom wherein the difference in elevation is very small. The primary path is provided with a plurality of parallel longitudinally spaced, rotatably driven conveyor rolls which are divided into two groups wherein the first group of conveyor rolls supports the article as it is conveyed over the secondary path and the second group of rolls lowers the article to deposit it on the secondary path comprised of a plurality of parallel driven endless belts. The rolls of the second group of rolls are individually provided with limited vertical movement which, upon signal when the article is entirely supported thereon, simultaneously drop to a position slightly below the elevation of the upper flights of the driven endless belts. Each roll of the second group is individually raised in sequence to the elevation of the primary path as the trailing edge of the article passes therebeyond to support the next succeeding article. In this arrangement and operation of the conveyor rolls, conveyed articles may be closely spaced and selected articles may be transferred to the secondary path without interrupting or interferring with the speed of movement of the articles moving along the primary path.

8 Claims, 8 Drawing Figures

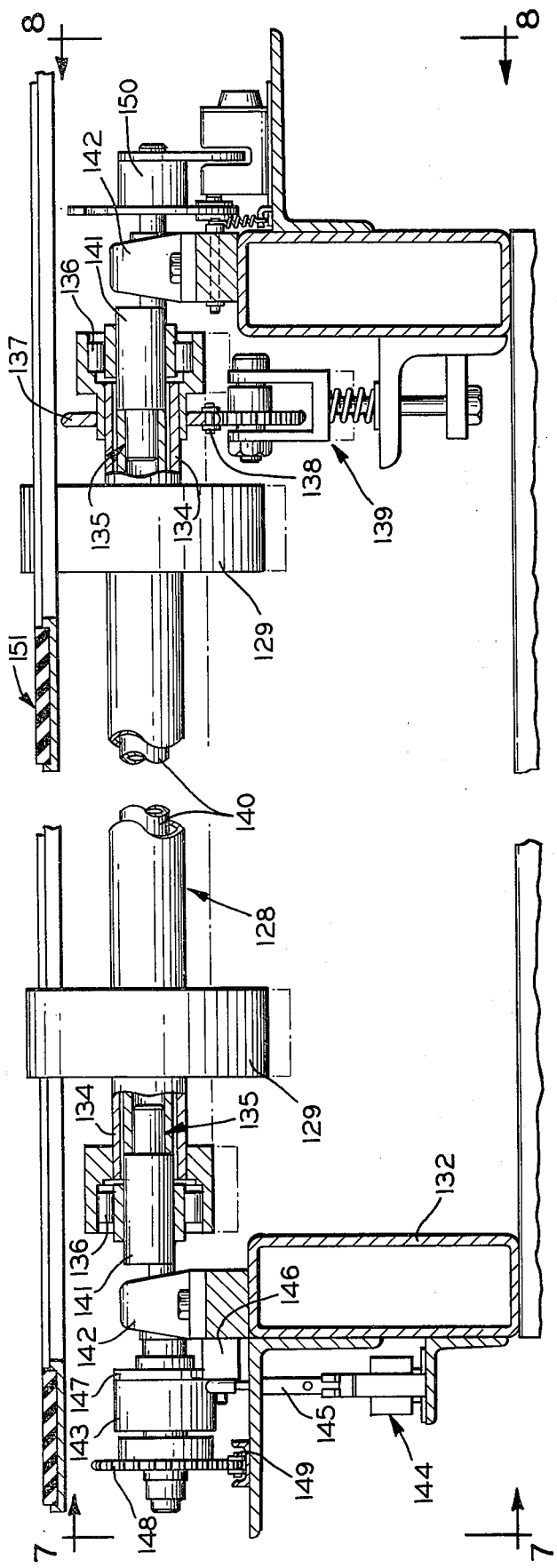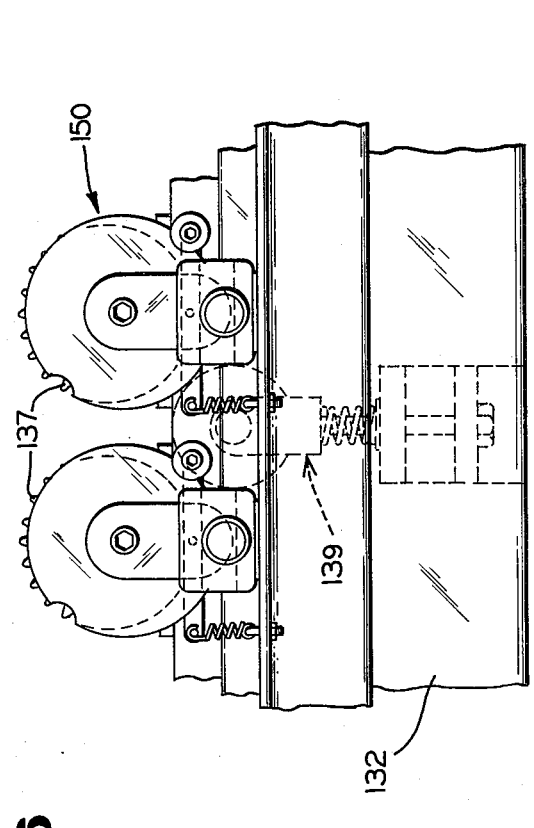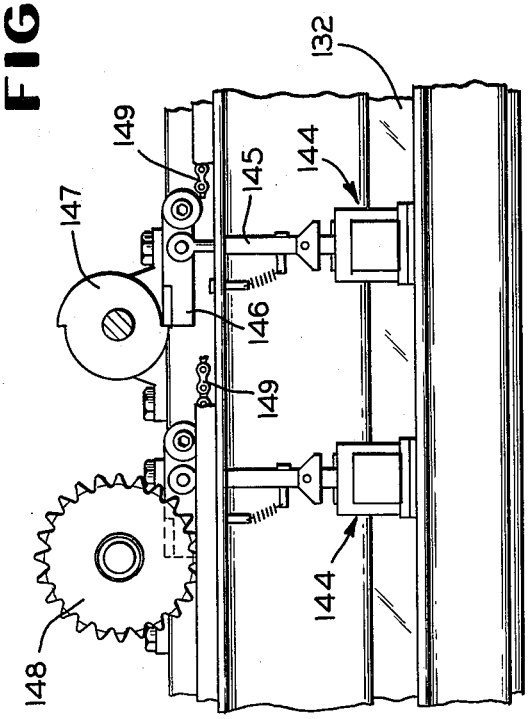

SHEET ARTICLE TRANSFER APPARATUS

BACKGROUND OF THE INVENTION

1. Field of the Invention

This invention generally relates to diverting conveyors, and more particularly to apparatus for continuously and/or selectively transferring sheet articles from a primary path to a lower elevation secondary path extending angularly therefrom.

2. Description of the Prior Art

In the handling of sheet articles, such as glass sheets from the end of a glass production line, it is often necessary to transfer the sheets from the path of a primary conveyor to the paths of other secondary conveyors which extend laterally therefrom. For example, in the continuous process of producing glass, it is common practice to employ roll conveyors to convey a continuous ribbon of glass to a cutting station or capping area, and thence individual sheets of glass to a loading station for stacking the glass sheets on storage bucks for transport to a warehousing area. Thus, when a storage buck is filled, the glass sheets must be directed to another loading station while the filled buck is removed and another moved into its place for filling.

One of the basic problems in transferring sheets of glass from one conveyor line to another is the speed at which the transfer can be made since more time is required to convey the sheets away from, than along a direct path. Therefore, a diverting apparatus is needed for transferring glass sheets selectively as well as continuously and conveying them away from a primary conveyor line without interrupting or interferring with the speed of movement of the other glass sheets on the primary conveyor line.

Various types of diverters by which sheet articles can be transferred from a primary conveyor to a secondary conveyor without interrupting or interferring with the movement of the sheets on the primary conveyor have been proposed in the past. These diverters have included mechanism such as sheet lifting devices for lifting articles over the junction points, swivel wheels, pusher mechanisms, etc. However, such mechanisms have been rather complex in construction and operation and subject to many maintenance problems.

SUMMARY OF THE INVENTION

In a transfer apparatus according to this invention, sheets of glass can be continuously or randomly transferred from a primary conveyor line to a secondary conveyor line without interrupting the speed of movement of the other sheets conveyed along the primary conveyor line at a high rate of speed. Generally speaking, the transfer apparatus transfers, upon signal, moving sheet articles which are conveyed in sequence along the primary conveyor line to a lower elevation secondary conveyor line extending across and desirably at an angle on the order to 45° thereto. Such an apparatus is provided with a primary path which forms a segment of the primary conveyor line and a secondary path which forms a segment of the secondary conveyor line. The primary path consists of at least two groups of longitudinally spaced parallel rows of rotatably driven conveyor rolls, and the secondary path consists of a plurality of parallel angularly disposed endless belts which extend diagonally across the two groups of conveyor rolls with their upper flights at the lower elevation of the secondary conveyor line. The two groups of conveyor rolls of the primary path are driven at a speed equal to the speed of the primary conveyor line, and the endless belts of the secondary path may be driven at the same or a faster rate of speed than the wheels of the primary conveyor line.

One, or the first group of rotatable conveyor rolls is stationarily mounted in line with the primary conveyor line for supporting and moving the conveyed articles into position over the endless belts. The other, or second group of conveyor rolls, is aligned with the first group and each roll thereof is provided with limited vertical movement from the plane of elevation of the first group to a lower elevation slightly below the plane of elevation of the top flights of the endless belts. The second group of vertically movable conveyor rolls is provided with mechanisms which simultaneously lower the rolls as a group for depositing the article on the endless belts and which individually and sequentially raise each roll to its original position after the trailing edge of the sheet article has passed thereover. The mechanism are commonly operated by suitable control means which may be actuated by the leading and/or trailing edge of the conveyed sheet articles. The conveying system as well as the raising and lowering mechanisms of the transfer apparatus, may be under automatic control by provision of suitable switching, counting, timing and/or inspection devices which actuate the relevant parts of the apparatus, or their operation can be manually controlled by an operator.

OBJECTS AND ADVANTAGES

An object of this invention is to provide a transfer apparatus by which closely spaced glass sheets can be transferred from one path of another without interferring with the movement of the sheets on a primary conveyor and at high rates of speed.

Another object of this invention is to provide a transfer apparatus with a plurality of means which simultaneously drop to lower an article thereon from a primary path and deposit it on a secondary path and individually raise in sequence to support the next succeeding article being conveyed along the primary path.

Other objects and advantages will become more apparent during the course of the following description when taken in connection with the accompanying drawings.

BRIEF DESCRIPTION OF THE DRAWINGS

In the drawings, wherein like numerals are employed to designate like parts throughout the same:

FIG. 6 is an enlarged cross sectional view with parts broken away, taken substantially along line 6—6 in FIG. 5 and showing another form of raising and lowering mechanisms;

FIG. 7 is an enlarged fragmentary side elevational view of the raising and lowering mechanism shown in FIG. 6, taken in the direction of line 7—7 in FIG. 6; and FIG. 8 is an enlarged fragmentary side elevational view of the raising and lowering mechanism taken in the direction of line 8—8 in FIG. 6.

DESCRIPTION OF THE PREFERRED EMBODIMENTS

Figure 1:
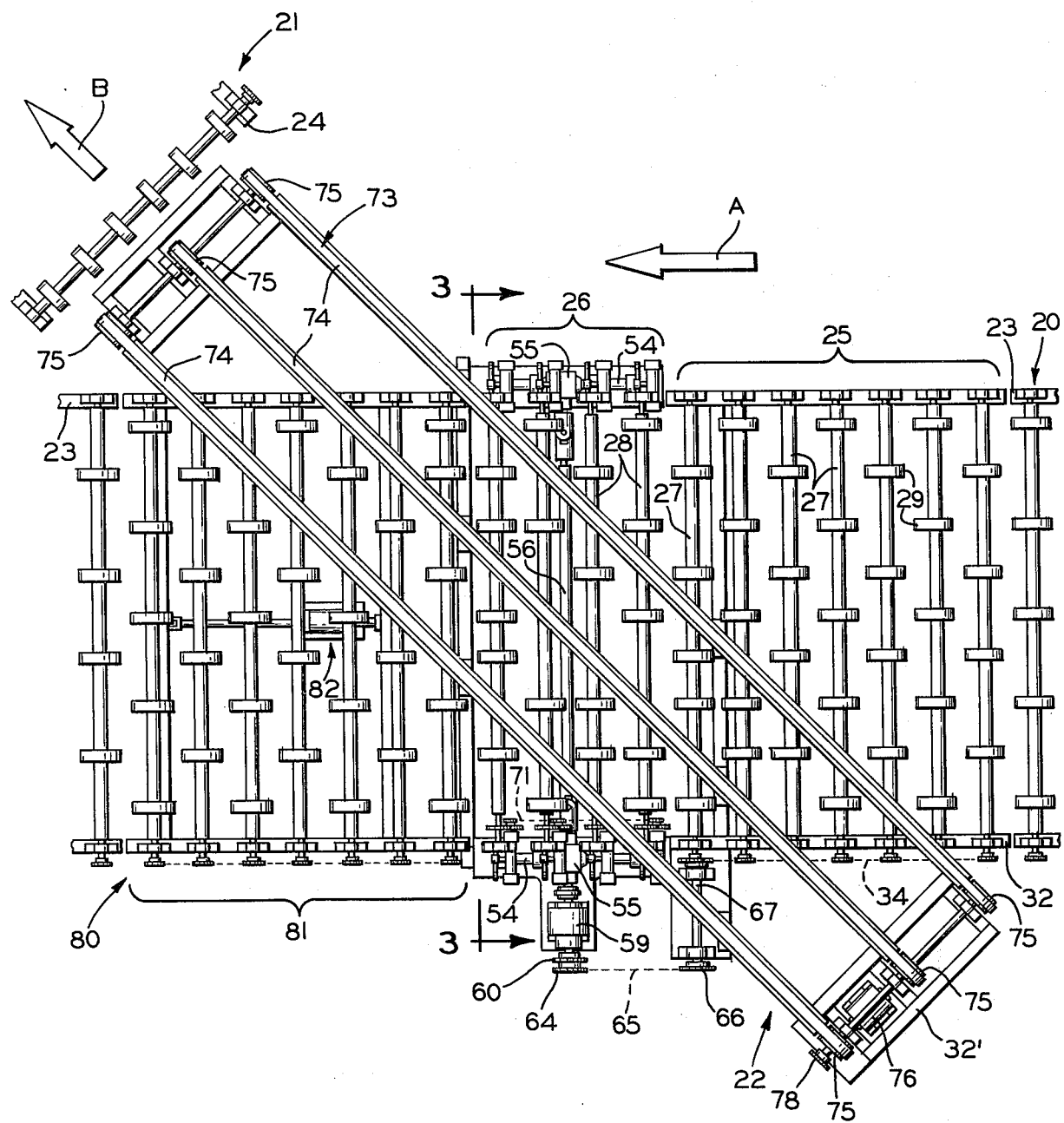
FIG. 1 is a plan view of one embodiment of a transfer apparatus constructed in accordance with this invention, together with a portion of a conveyor system in which it may be used.
Figure 5:
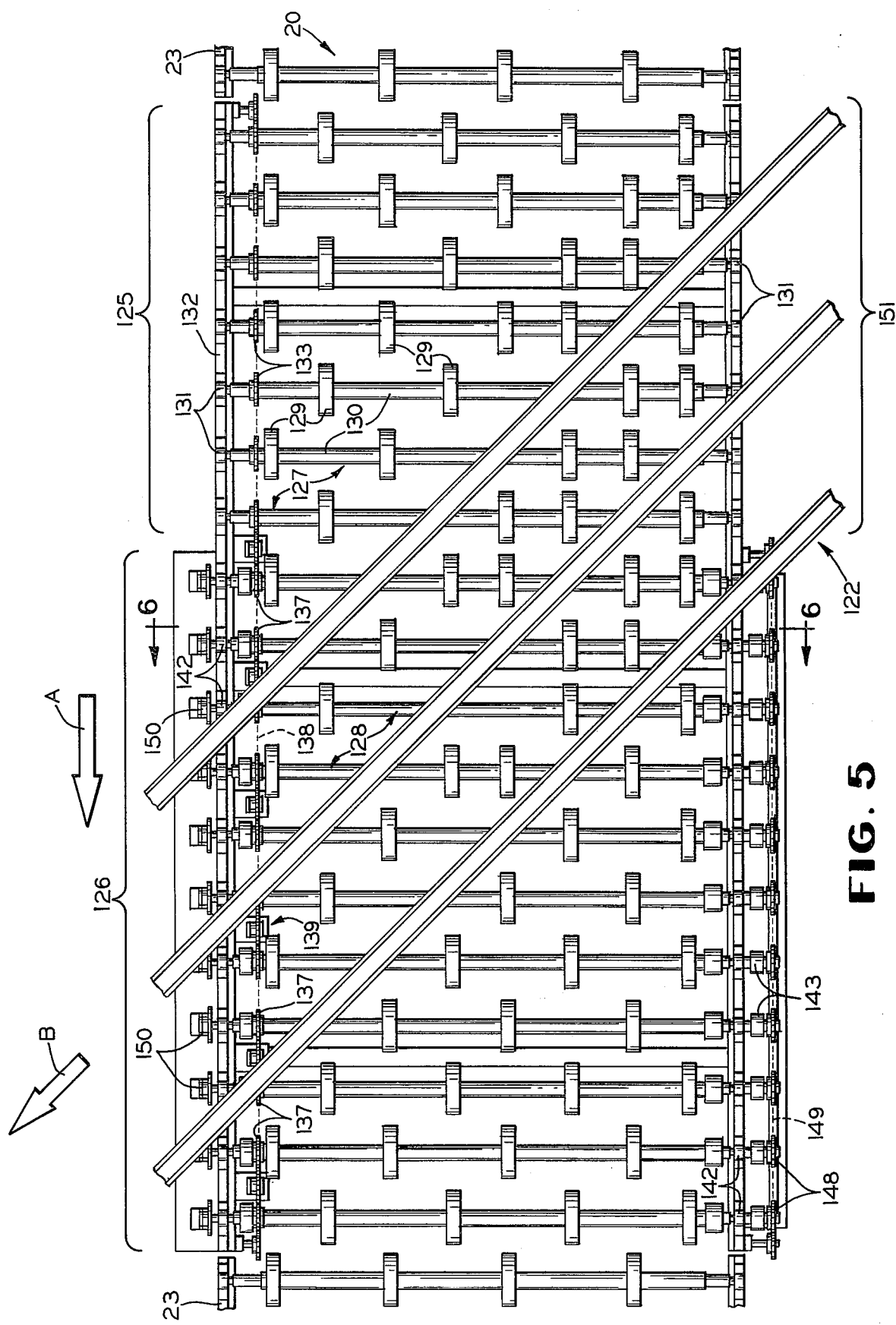
FIG. 5 is a plan view of another embodiment of a transfer apparatus similar to FIG. 1.

Referring to FIG. 1, there is illustrated a primary conveyor line 20 and a secondary conveyor line 21 disposed at a lower elevation and extending angularly therefrom, preferably at an angle on the order of 45°. Interposed between the primary conveyor line and the secondary conveyor line 21 is an article transfer apparatus 22 (or 122 as illustrated in FIG. 5), which effects transfer of sheet articles (not shown) by lowering them one at a time from the primary line 20 to the secondary line 21 by operation of the transfer apparatus 22 or 122 to be described in detail hereinafter. Advancement of the sheet articles may be continued along the path of the primary conveyor line 20 in the direction of arrow A, or the articles may be transferred to the secondary conveyor line 21 and conveyed therealong in the direction of arrow B. The conveyor lines 20 and 21 are generally comprised of rotatably driven roll conveyor sections 23 and 24, respectively, which in a known manner may convey a succession of sheet articles along the respective conveyor lines 20 and 21. Since the structure and operation of the conveyor sections 23 and 24 are conventional, it is not deemed necessary to describe them in detail herein.

The provision of a transfer apparatus 22 or 122 is particularly desirable in a continuous glass production line wherein the rate of travel of glass sheets therealong, which is normally dependent on the rate of production of a glass ribbon from which the sheets are cut, is too fast for satisfactory direct handling from its end whereat the glass sheets are removed for stacking in a warehouse area or further cutting and stacking.

FIGS. 1 and 5 illustrate in more detail the construction of the transfer apparatus 22 and 122 at the junction of the secondary conveyor line 21 with the primary conveyor line 20. The transfer apparatus shown therein are each provided with a primary path aligned with and extending in the direction of arrow A in the primary conveyor line 20 and a secondary path aligned with and extending in the direction of arrow B in the secondary conveyor line 21. The primary path of each transfer apparatus 22 or 122 is provided with two groups 25 and 26 or 125 and 126 of parallel longitudinally spaced rotatably driven roll assemblies 27 and 28 or 127 and 128, respectively, aligned with and positioned at the same elevation as the conveyor sections 23 of the primary conveyor line 20. One of these groups 26 or 126 of these conveyor roll assemblies 28 or 128 is provided with limited vertical movement, i.e., on the order of three-eighths inch between the elevation of the primary conveyor line 20 and the lower elevation of the secondary conveyor line 21 to transfer sheet articles from the primary path to the secondary path of the transfer apparatus 22 or 122.

Each roll assembly 27 or 127 of group 25 or 125 is substantially identical to one another and comprises like parts. Consequently, a description of one roll will serve as a description of the other in their respective groups 25 or 125. Also, each conveyor roll assembly 26 or 128 of group 26 or 126 is substantially identical, and likewise a description of one roll will suffice as a description of the other rolls in their respective groups 26 or 126.

Figure 2:
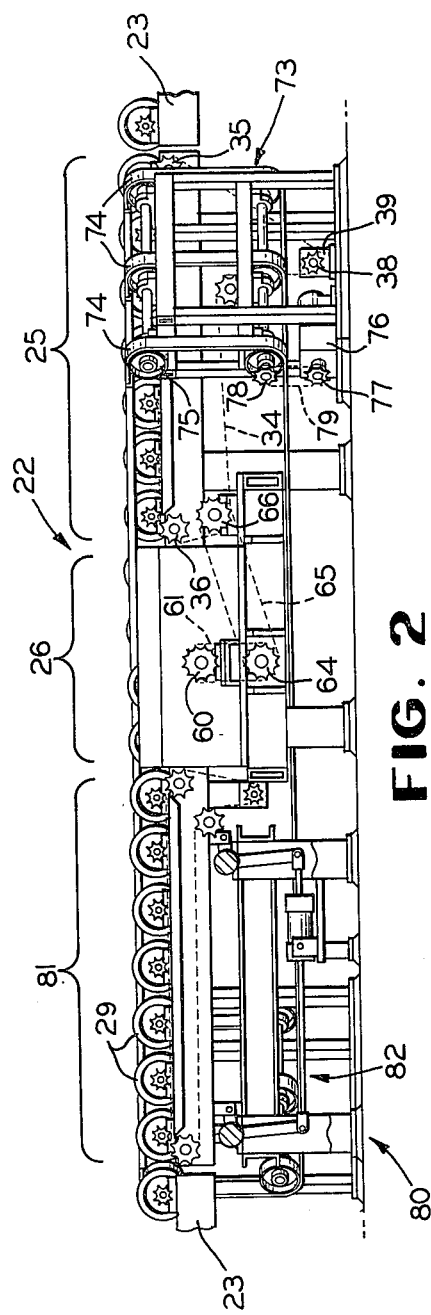
FIG. 2 is an enlarged side elevational view of the transfer apparatus shown in FIG. 1, with parts of the conveyor system broken away.
Figure 3:
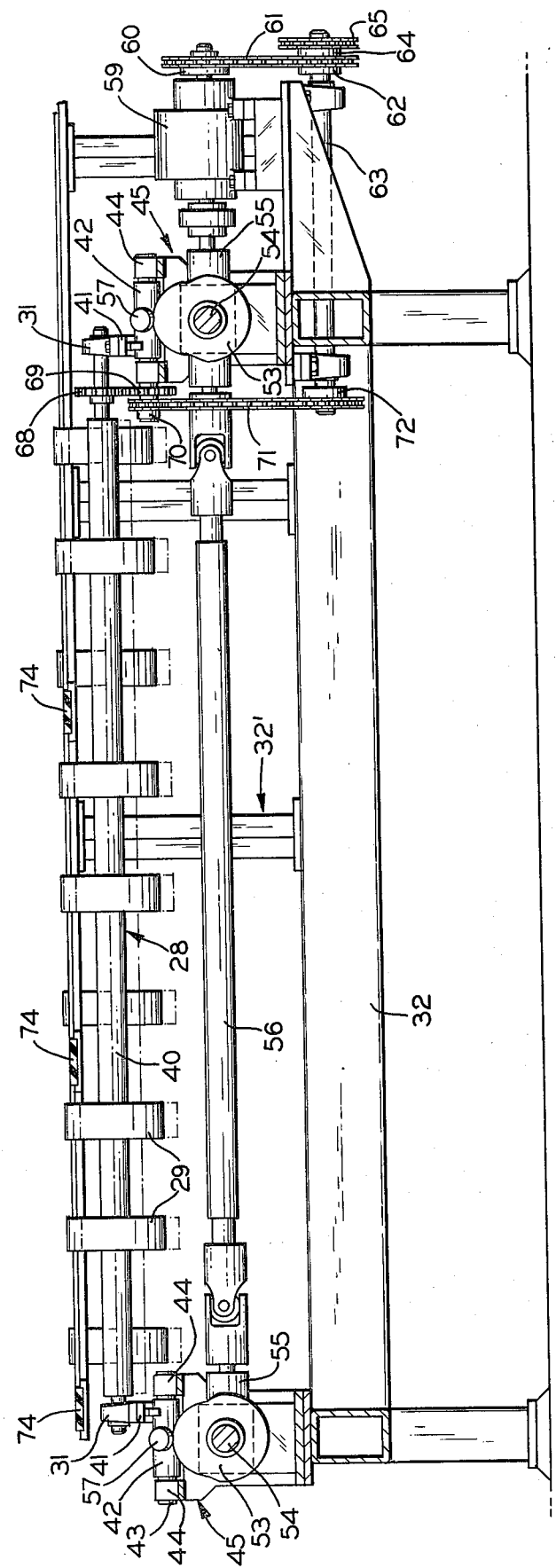
FIG. 3 is a cross sectional view taken substantially along line 3—3 in FIG. 1 of the transfer apparatus illustrating a mechanism for raising and lowering a vertically movable conveyor roll.
Figure 4:
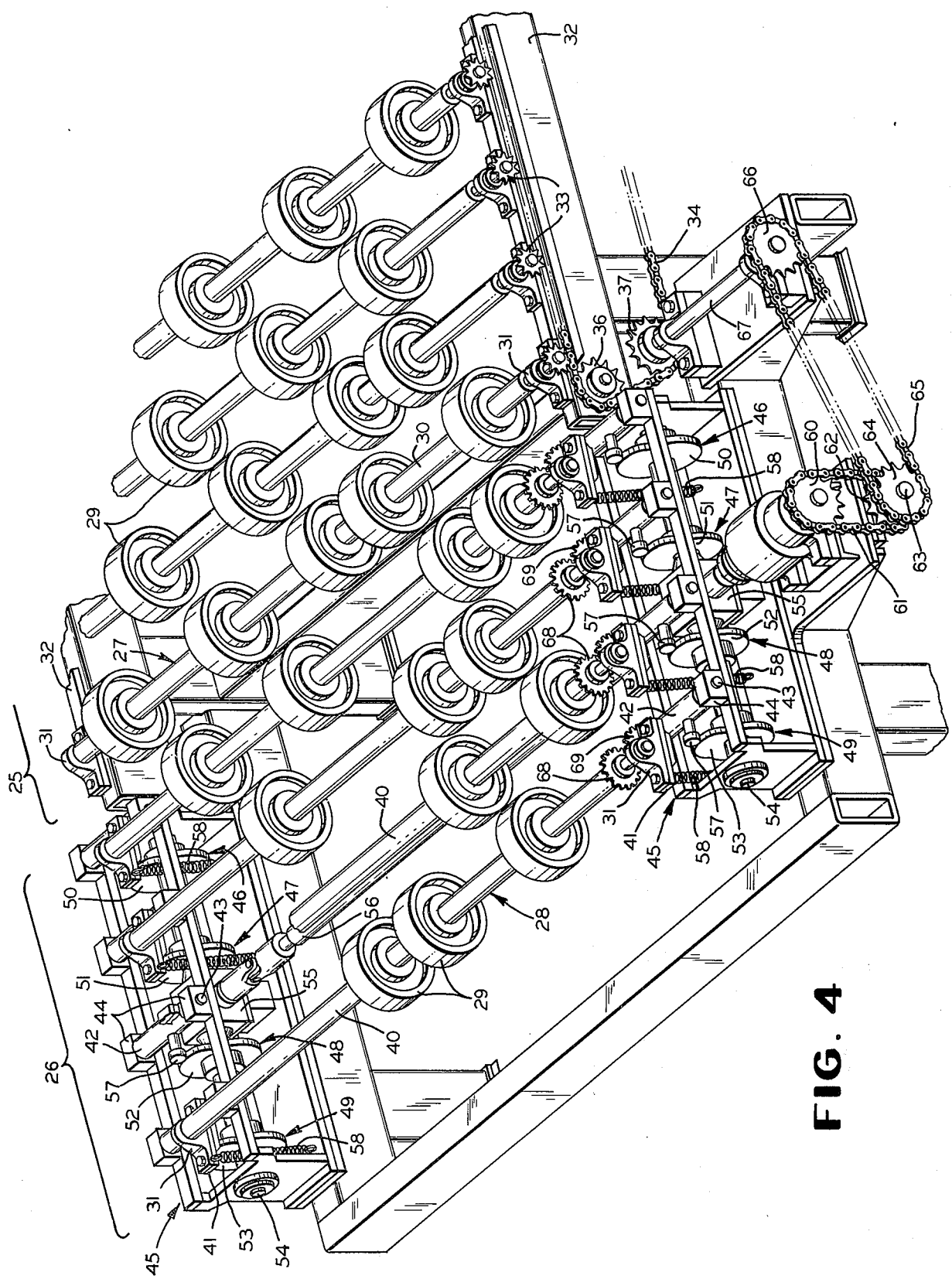
FIG. 4 is an enlarged perspective view of the transfer apparatus with parts thereof broken away further illustrating the drive mechanism shown in FIG. 3.

Referring now to the embodiment of the invention shown in FIGS. 1 through 4, one, or the first, group 25 of the stationarily mounted roll assemblies is comprised of a plurality, in this particular embodiment, of seven like parallel longitudinally spaced conveying roll assemblies 27 positioned downstream of and in line with a conveyor section 23 of the primary conveyor line 20. As best shown in FIG. 4, each roll assembly 27 includes a plurality of annular conveying roll collars 29 transversely arranged with respect to the direction of the primary path and mounted for rotation with a roll shaft 30 whose ends are each mounted in pillow block bearings 31 affixed in a well-known manner to a conveyor frame 32. A common end of each roll shaft 30 is provided with a driven sprocket 33 which is adapted to be rotatably driven by a chain 34 and entrained around idler sprockets 35, 36 and 37. The chain 34 is driven by a drive sprocket 38 mounted on a shaft of an electric motor 39 as shown in FIG. 2.

The other, or second, group 26 of vertically movable roll assemblies 28, is comprised of a plurality, in this embodiment four, like longitudinally spaced parallel rolls which are positioned in line with and downstream of the first group 25. As best shown in FIGS. 3 and 4, each roll assembly 28 includes a plurality of transversely arranged conveying roll collars 29 mounted for rotation with a roll shaft 40 whose ends are each rotatably mounted in pillow block bearings 31 affixed in known manner to cantilever pivot arms 41 for limited, substantially vertical movement. The pivot arms 41 are each fixedly secured to a hinge sleeve 42 which is pivotally mounted on a pivot pin 43 whose ends are each rotatably mounted in bearing blocks 44 affixed in a well-known manner to the top rails of a box frame section 45 forming part of the conveyor frame 32.

The four conveyor roll assemblies 28 are adapted to be lowered in unison from the elevation of the first group of conveying roll assemblies 27 to slightly below the elevation of the secondary path of the transfer apparatus 22, and individually raised in sequence to their prior level by means of four individual pairs of cam devices 46, 47, 48 and 49, one at either end of each roll. Therefore, each pair of cam devices is provided with a different configuration so that the four conveyor roll assemblies 28 will drop simultaneously and then the roll adjacent the group of rolls 27 will first raise to its former elevation and the three succeeding rolls will subsequently raise to their prior elevation during one revolution of the cams. Thus, the cam devices 46, 47, 48 and 49 include pairs of plate cams 50, 51, 52 and 53 respectively, mounted for rotation with driven shafts 54 extending from cross drive units 55. The cross drive units 55 are interconnected by a drive shaft 56 for their common operation. The pairs of plate cams 50, 51, 52 and 53 are each configured so that during their first increments of rotational movement, they will simultaneously and instantaneously permit a cam follower 57, connected to the hinge sleeve 42, to move to a lower position and thus drop the wheel assemblies to their lower elevation as indicated by the dotted line position shown in FIG. 3 when a sheet article is wholly supported by the second group 26 of roll assemblies 28. The cams 50, 51, 52 and 53 are designed and timed relative to each other so that during their next increments of movement, the first upstream row of roll assemblies 28 will first raise to its prior level and then each succeeding downstream roll will individually raise to its prior level after the trailing edge of a sheet article has passed thereover during one revolution of the cam devices. Spring means 58 may be provided between the pivot arm 41 and an anchor point on the frame 32 to ensure that each follower 57 will remain in contact with and follow the configuration of its respective plate cam.

The drive units 55 are rotatably driven through a normally disengaged one revolution clutch 59 which, when energized, engages and upon the completion of one revolution, resumes its normally disengaged position. As shown in FIGS. 3 and 4, the driving portion (not shown) of the clutch 59 may be rotatably driven by a sprocket 60 driven by a chain 61 entrained around a sprocket 62 which is mounted for rotation with a rotatable jackshaft 63. The jackshaft 63 is driven by a sprocket 64 via a chain entrained around a sprocket 66 driven from the idler sprocket 37 via a connecting shaft 67. The cross drive units 55 and the clutch 59 are commercially available units and a detailed description of their construction and operation herein is not deemed necessary.

Each conveyor roll assembly 28 is continuously rotatably driven by a drive mechanism which also permits the rolls to move in their reciprocable vertical path. Thus, as shown in FIGS. 3 and 4, the rotatable shaft 40 is provided with a gear 68 which is meshingly engaged with a like idler gear 69 mounted for rotation on the pivot pin 43 so that as the shaft 40 pivots about the pin 43, the gear 68 will also move relative thereto along the pitch line of the gear 69 without becoming disengaged therefrom. A sprocket 70 drivingly coupled to the gear 69 is rotatably driven by a chain 71 entrained about it and a driving sprocket 72 which is mounted for rotation with the driven jackshaft 63.

Referring now to FIGS. 1 and 2, the secondary path of the transfer apparatus 22 includes an endless belt conveyor 73, whose conveying surface is aligned with and positioned at the lower elevation of the conveyor section 24 employed in the secondary conveyor line 21. As illustrated therein, the belt conveyor 73 is positioned with respect to the second group 26 of vertically movable roll assemblies 28 in such a manner that it receives sheet articles to be transferred on the upper flights of a plurality of spaced parallel endless belts 74. Thus, the central portion of the belt conveyor 73 is positioned to coincide with the central portion of the vertically movable group 26 of wheel assemblies 28. Each of the belts 74 is entrained around pulleys 75 supported on a sub-frame 32' which may be part of the conveyor frame 32. In this case, the belts 74 project at an angle of 45° from the downstream end of the second group of movable wheel assemblies 28. The conveying roll collars 29 of both groups 25 and 26 are arranged along their respective shafts 30 and 40 so as not to interfere with the operation of the belts 74. The belts 74 are driven in a conventional manner by an electric motor 76 via drive and driven sprockets 77 and 78, respectively, interconnected by a chain 79 (see FIG. 2). Also, the belts 74 may be idle when the sheet articles are passing along the primary conveyor line 20 and are driven only when the sheets are to be transferred. When an article is transferred, the roll assemblies 28 of the second group 26 are simultaneously lowered and raised individually in sequence when the trailing edge of the sheet has passed thereover. This sequence of operation may be triggered in response to the tripping of a limit switch (not shown) when the article has reached the junction of the belts 74 and the movable group 26 of roll assemblies 28.

Since in this embodiment of the invention the belts 74 extend from the downstream end of the transfer apparatus 22, the annular conveyor roll collars 29 of a conveyor section adjacent thereto must also be dropped below the level of the upper flights of the belts 74. As best shown in FIG. 2, a separate conveyor section 80 capable of limited vertical movement from an operative to an inoperative position is located adjacent to and downstream of the transfer apparatus 22. The movable section 81 thereof is lowered through a mechanical crank and linkage mechanism 82 to a position where its conveyor roll collars 29 lie below the plane of the upper flights of the endless belts 74. The vertical movement of this section 81 is synchronized with the vertical movement of the group 26 of roll assemblies 28 so that it will lower in unison therewith and raise in a timed relation with the passing of an article therefrom. The construction and operation of the conveyor section 80 is conventional so a detailed description thereof is not deemed necessary.

In the embodiment of the invention illustrated in FIGS. 5 through 8, the transfer apparatus 122 functions in the same manner as does the previously described transfer apparatus 22. Thus, the primary path of the apparatus 122 also comprises two groups 125 and 126 of longitudinally spaced parallel driven conveyor roll assemblies 127 and 128 aligned with and set at the same elevation as the conveyor sections 23 in the primary conveyor line 20.

As shown in FIG. 5, the first group 125 of roll assemblies 127 is comprised of seven like rolls wherein each roll includes a plurality of transversely spaced annular conveyor roll collars 129 fixedly mounted on a rotatable roll shaft 130 for rotation therewith. The shafts 130 are mounted in pillow block bearings 131 which are secured to the upper rails of a frame 132 by suitable fastening means. A driven sprocket 133 is provided near one end of each shaft 130 rotatably driving the shaft 130.

The second group 126 of vertically movable roll assemblies 128 is comprised of eleven like longitudinally spaced parallel rolls which are positioned in line and downstream of the first group 125. As best shown in FIG. 6, each wheel assembly 128 includes a plurality of annular conveying roll collars 129 transversely arranged with respect to the primary conveying line 20 and mounted for rotation with a hollow rotatable shaft 134 which, in turn, is mounted on an eccentrically mounted shaft 135 which provides for the vertical movement. As illustrated in FIG. 6, each end of the hollow shaft 134 is mounted in roller bearings 136 supported on the eccentric shaft 135 for rotation relative thereto. The shaft 134 is provided with a driven sprocket 137 which is in line with the driven sprockets 133 of the group 125 (see FIG. 5). Thus, the driven sprockets 133 and 137 of the groups 125 and 126, respectively, may be simultaneously driven by a common chain 138 driven by an electric motor (not shown). Also, a series of lost motion devices 139 are provided to maintain the chain 138 in contact with the sprockets 137 as they are moved in a vertical direction. The eccentrically mounted shaft 135 comprises a hollow shaft portion 140 which has an eccentric stub shaft 141 extending from each of its ends. These stubs shafts 141 are each mounted in a pillow block bearing 142 secured in known manner to the top rail of the frame 132 and have portions which extend beyond the bearings 142. On one stub shaft 141, a conventional two-impulse clutch 143 is mounted which, upon a first signal, will engage and rotate the eccentric shaft 135 a half revolution to its lower position as indicated by the dotted lines in FIG. 6, and then disengaged. Upon a second signal, the clutch 143 will engage and rotate the eccentric shaft 135 another half revolution to raise it to its upper position, and then again disengage. The clutch 143 may be of the electric-magnetic type and, as shown in FIG. 7, may be controlled by a solenoid 144 whose plunger 145 is pivotally connected to a movable control arm 146 which cooperates with a two-step driven plate 147 of the clutch 143. The driven member (not shown) of the clutch 143 may be continuously driven by a sprocket 148 which is rotated by a chain 149 driven by an electric motor (not shown). The other stub shaft 141 may be provided with a two-position indexing device and brake mechanism 150 for preventing over travel of the eccentric shaft 135 when it is moved between its two positions. The eleven vertically movable roll assemblies 128 are operated in a like manner as previously described for the transfer apparatus 22. That is, they will simultaneously move to their lower elevation upon a first signal and then individually raise in sequence when the trailing edge of an article has passed thereover.

The secondary path of the transfer apparatus 122 also includes a belt conveyor 151 which is positioned with respect to the group 26 of vertically movable roll assemblies 128 and functions in a like manner as the conveyor 73 in the transverse apparatus 22. Thus, no further description is deemed necessary herein.

In summary, a transfer apparatus according to the present invention is one by which horizontally conveyed sheets may be transferred from a primary conveyor line 20 to a secondary conveyor line 21 without interrupting a continuous in-line flow of sheet articles along the primary conveyor line 21. This is accomplished by positioning two groups of driven conveyor rolls between conveyor units of the primary conveyor line 21 and an endless belt conveyor between the primary and secondary conveyor lines wherein the group of vertically movable rolls is located at the desired point of transfer. The conveyor rolls are all driven so that in the primary conveyor line 21, they act as a conveyor unit along that line for sheets not being transferred. When a sheet to be transferred is positioned entirely on the vertically movable conveyor rolls in the primary line, the conveyor rolls are lowered below the top flight of the belts of the secondary path to deposit a sheet on the belts and then individually raise to their former elevation after the trailing edge has passed thereover. The transferring of sheets to the secondary line may be effected on any suitable continuous and/or selective basis by any different number of types of control means well-known to persons skilled in the art. For example, where the sheets being conveyed along the primary conveyor line are substantially identical, detector means such as a limit switch (not shown) may be provided at the junction of the primary and secondary conveyor lines to sense the presence of a sheet article on the transfer apparatus, such detector means serving to control the operation of the transfer apparatus.

From the foregoing, it can be seen that the invention provides an improved apparatus for conveying glass sheets in closer spaced relationship and with much greater speed than is normally possible. Also, it is to be understood that the exact number of conveyor rolls employed is not of significance as different sizes of sheets will have varying requirements in this respect.

It is to be understood that the forms of the invention herewith shown and described are to be taken as illustrative embodiments only of the same, and that various changes in the shape, size, and arrangements of the parts may be resorted to without departing from the spirit of the invention.

We claim:

1. In a transfer apparatus of the type including a primary conveyor and a secondary conveyor extending angularly therefrom and set at a lower level than the primary conveyor and having a first group of longitudinally spaced fixedly supported driven rolls arranged in line with and at the same level as the primary conveyor, a second group of longitudinally spaced movably supported driven rolls arranged in line with and at the same level as said first group of rolls, the rolls of said second group being movable in a substantially vertical direction with respect to the rolls of said first group, a plurality of parallelly spaced driven endless belts arranged between said second group of rolls and in line with and at the same level as the secondary conveyor, the improvement comprising:
   a. a number of rotary means corresponding to the number of vertically movable rolls wherein a said rotary means is operatively connected to a said vertically movable roll for moving said roll in the vertical direction, and
   b. a clutch for operating said rotary means one revolution whereby said rotary means simultaneously lower said rolls of said second group below the level of said belt to deposit an article thereon and individually and sequentially raise said rolls of said second group to the level of said first group after the trailing edge of the article has passed therebeyond.

2. In an apparatus for transferring articles from a primary path to a secondary path extending angularly therefrom at a lower elevation, including a first plurality of conveying rolls longitudinally arranged along the primary path and supported in a common plane, a second plurality of conveying rolls longitudinally arranged, aligned with and adjacent to the first plurality of rolls in the primary path and supported in a common plane, the rolls of the second plurality being individually movable in a substantially vertical direction with respect to the rolls of the first plurality, the improvement comprising:
   a. a like plurality of rotary means corresponding in number to said second plurality of conveying rolls, said rotary means simultaneously moving each vertically movable conveying roll from the plane of the first plurality of rolls to the lower elevation of the secondary path and individually moving each said vertically movable conveying roll beginning with the roll first adjacent to said first plurality of rolls in sequence from the elevation of the secondary path to the plane of said primary path, and
   b. a clutch for rotating said rotary means one revolution whereby articles conveyed along the primary path are lowered therefrom and deposited onto the secondary path in a closely spaced relationship without interfering with the movement of the articles on the primary path.

3. An apparatus for transferring articles from a primary path to a secondary path as claimed in claim 2, wherein each of the plurality of rotary means comprises cam means for moving each movable roll in a vertical direction.

4. An apparatus for transferring articles from a primary path to a secondary path as claimed in claim 3, wherein each said cam means comprises a rotary plate cam, a cam follower connected to said vertically movable roll, and a spring connected to said vertically movable roll for holding said follower in contact with said rotary plate cam.

5. An apparatus for transferring articles from a primary path to a secondary path as claimed in claim 2, wherein each of the plurality of said rotary means comprises a shaft having an eccentrically positioned stub shaft extending from each of its ends and on which a said conveyor roll is rotatably mounted, said shaft being substantially vertically movable between upper and lower positions as it is rotated on its said eccentric stub shafts.

6. An apparatus for transferring articles from a primary path to a secondary path as claimed in claim 5, wherein each said rotating means also includes a two-position indexing means to position said eccentrically mounted shaft in its upper and lower positions.

7. An apparatus for transferring articles from a primary path to a secondary path as claimed in claim 6, wherein said indexing means includes a brake for stopping the indexing means in either of its positions.

8. An apparatus for transferring articles from a primary path to a secondary path as claimed in claim 5, including operating means for simultaneously engaging each said clutch to simultaneously move said eccentrically mounted shafts to their lower position and thence individually engaging each said clutch to sequentially move said eccentrically mounted shafts to their upper position.

* * * * *